Figure 1:
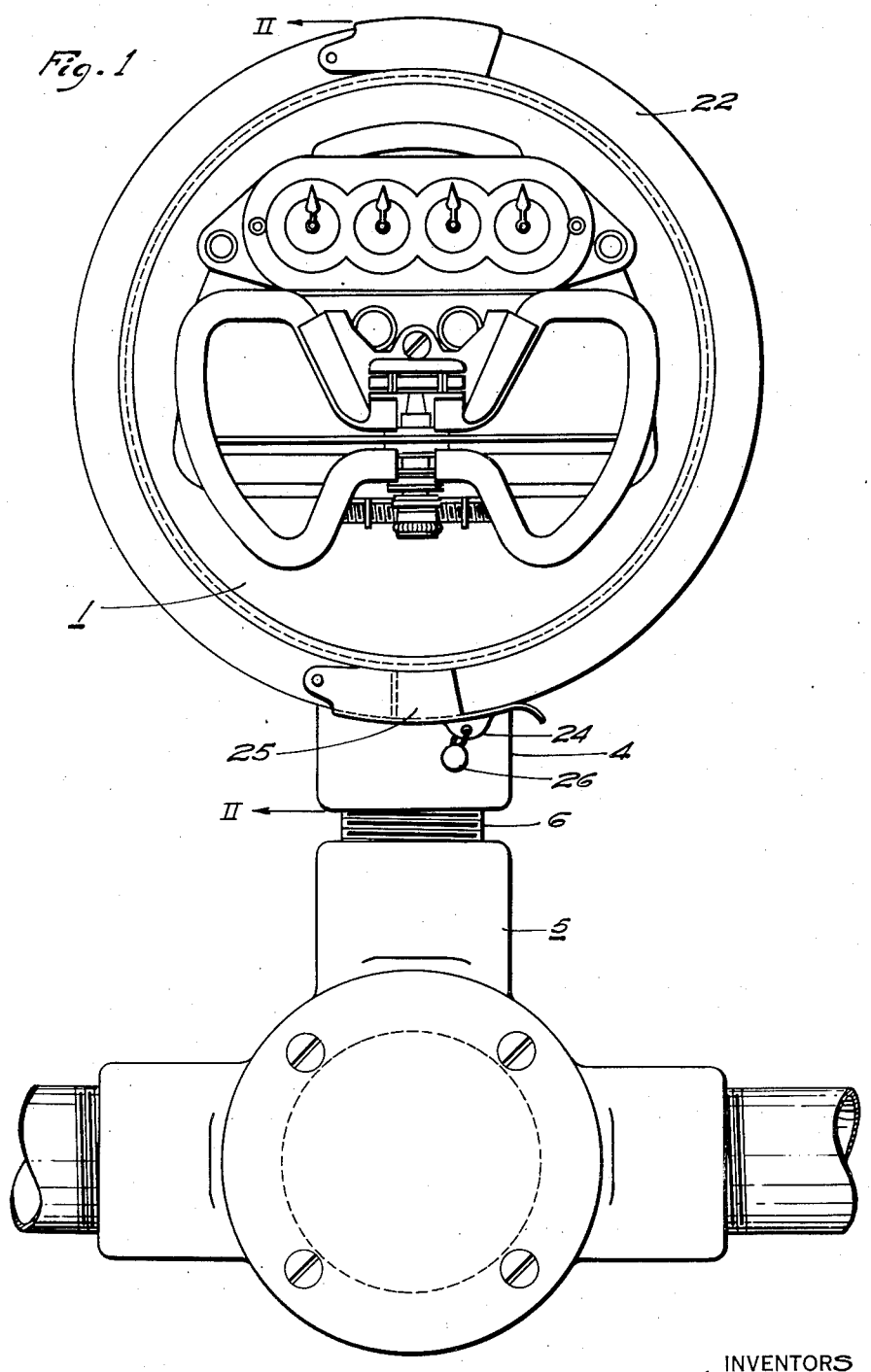

Jan. 3, 1933. W. G. MYLIUS ET AL 1,893,177
WATTHOUR METER
Filed Sept. 13, 1928    4 Sheets-Sheet 1

INVENTORS
Walter G. Mylius &
Bert G. LaBar.
BY
ATTORNEY

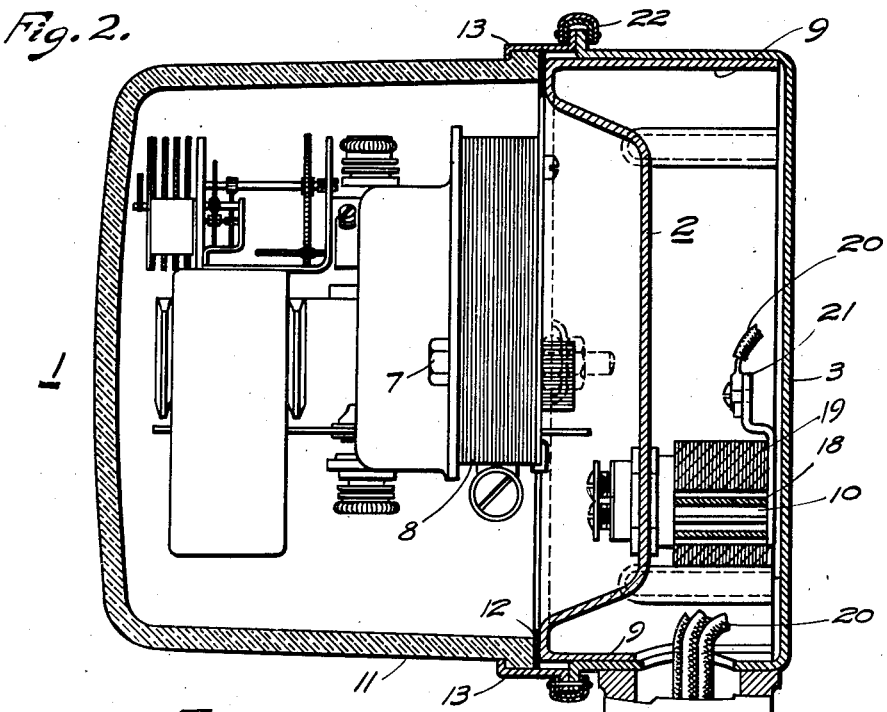
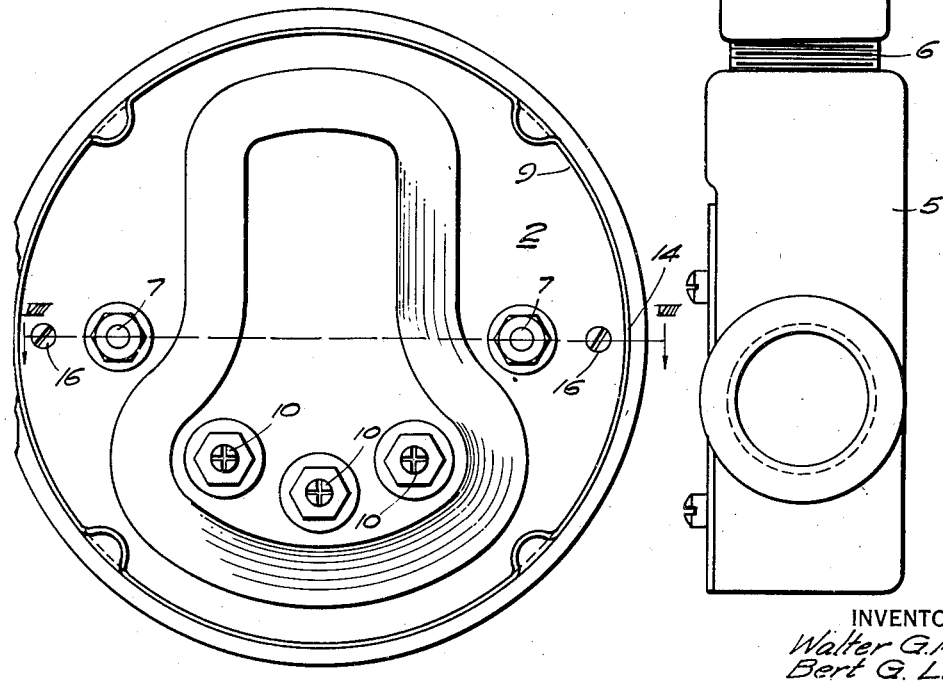

Jan. 3, 1933.  W. G. MYLIUS ET AL  1,893,177
WATTHOUR METER
Filed Sept. 13, 1928  4 Sheets-Sheet 3

INVENTORS
Walter G. Mylius &
Bert G. LaBar.
BY
Wesley G. Carr
ATTORNEY

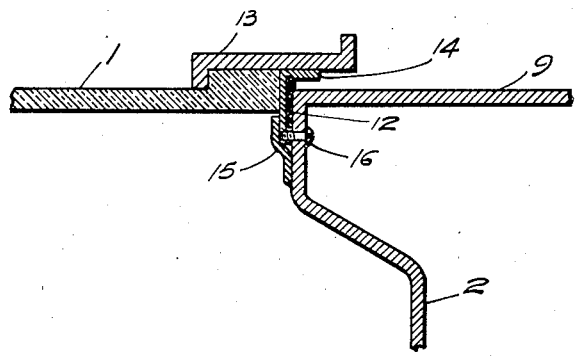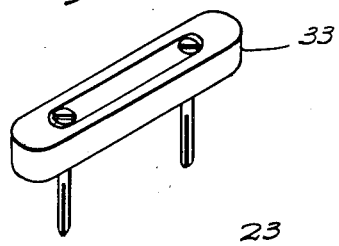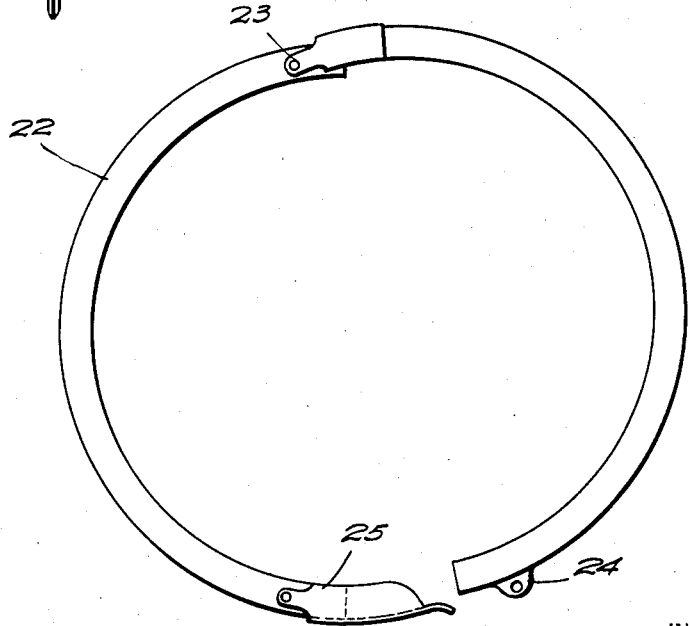

Patented Jan. 3, 1933

1,893,177

UNITED STATES PATENT OFFICE

WALTER G. MYLIUS, OF SUMMIT, AND BERT G. LA BAR, OF UNION, NEW JERSEY, ASSIGNORS TO WESTINGHOUSE ELECTRIC AND MANUFACTURING COMPANY, A CORPORATION OF PENNSYLVANIA

WATTHOUR METER

Application filed September 13, 1928. Serial No. 305,778.

Our invention relates to electrical instruments and more particularly to electric meters.

When electrical instruments of the non-portable type are installed for service, it is customary to rigidly secure the instrument to a supporting structure and to separately connect the several flexible leads of the instrument to the electric circuit with which the instrument is to be associated.

Another practice which has been followed is to secure a conduit nipple to the casing of the instrument surrounding the instrument leads. When the instrument is installed for service the leads are first connected to the conduit-encased leads from the circuit to be metered and the nipple is then secured to the conduit.

Both of these constructions are substantially permanent in character and when it becomes necessary to remove the instrument, either for replacement or for testing purposes, considerable difficulty is encountered, and the cost involved, from a labor standpoint, is a very appreciable item.

Further, when the instruments have been removed for testing, it has been the usual practice to hang them upon a test rack and separately connect the leads of the instrument to the respective leads of the test circuit. In this operation, the leads of the instrument must be first identified and then connected to the proper terminals of the test circuit.

These conditions obtain, in the electrical metering field, in general, and are peculiarly objectionable in the case of watthour meters used to measure and integrate the energy used by the individual consumers of power companies. In this field the meters are usually installed indoors on the customer's premises and considerable time is consumed by the meter-reader in gaining access to the dwelling, or building, within which the meter is installed, to periodically note the reading of the meter.

Further, when it is desired to replace a particular meter, the relatively permanent character of the installation must be disrupted in order to remove the meter, and a new meter must then be more or less permanently mounted in its place.

It is an object of our invention, therefore, to provide an electrical instrument and means for mounting the same, characterized by the fact that the instrument is readily separable from the mounting means.

Another object of our invention is the provision of an electrical instrument and mounting means therefor, whereby the electrical connections to the meter are made or broken, respectively, coincident with the movement of the instrument into operative position and the subsequent removal thereof.

A further object of our invention is to provide a meter and mounting means therefor, which is adapted to be mounted on the outer surface of a building or dwelling of a consumer to thereby facilitate the reading thereof, and to afford ready access thereto in the event that the meter is to be removed or replaced.

A further object of our invention is to provide a meter structure and mounting therefor, which is substantially weather-tight in construction and embodies means for reducing the hazard of unauthorized tampering with the operating mechanism of the meter.

Further objects relating to structural details of the meter and mounting means will be apparent from the following description.

In practicing our invention we provide an electrical instrument, such as a watthour meter, having contact pins projecting therefrom and electrically connected to the operating windings of the instrument. An electrical conduit system and outlet box are mounted upon a suitable support, such as the outer surface of a building, and contact sockets are provided in the outlet box for cooperation with the contact pins carried by the meter. A portion of the meter is adapted to be received in the outlet box, and, coincident with the movement thereof into the box, the contact pins on the meter operatively engage the sockets mounted in the box.

Figure 4:
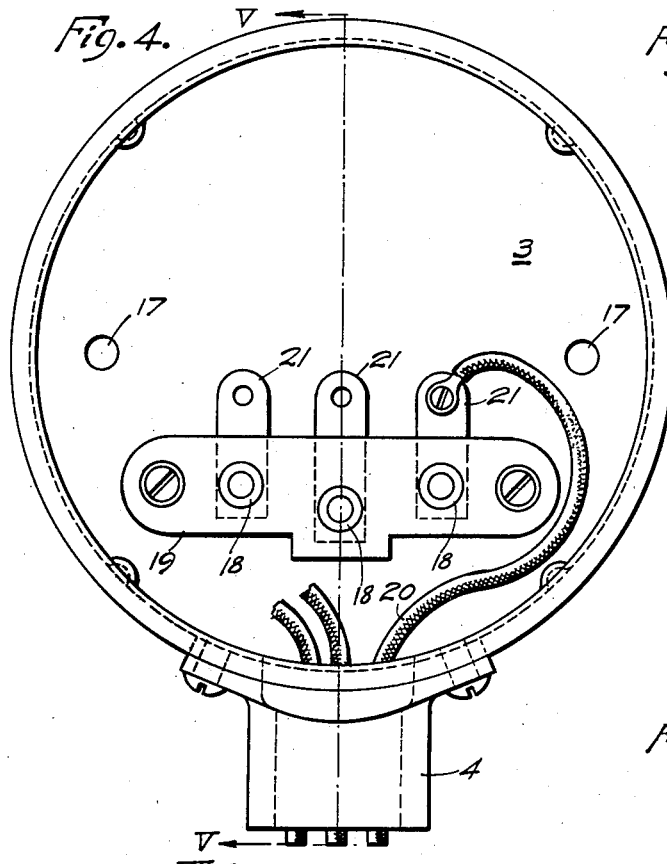
Figure 5:
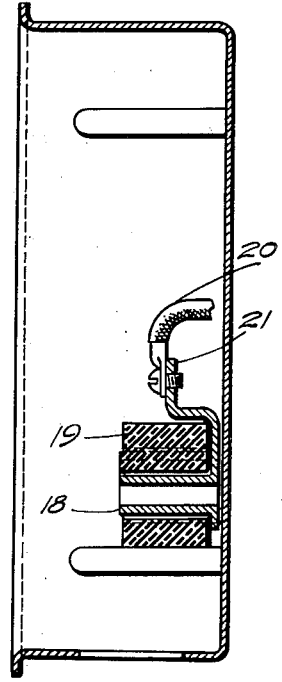
Figure 6:
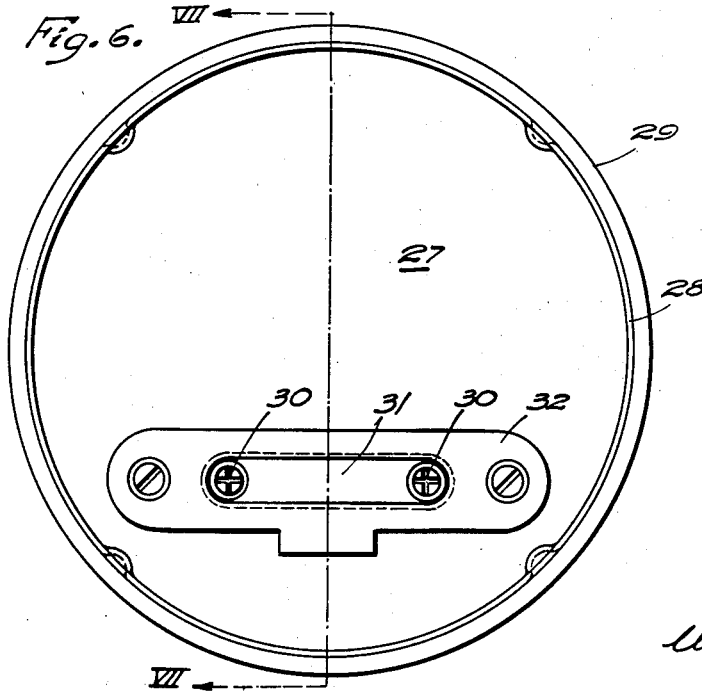
Figure 7:
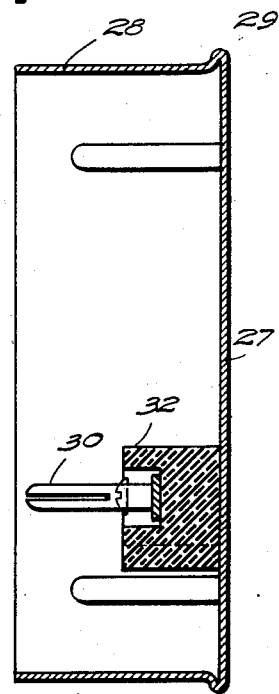

In the accompanying drawings,

Figure 1 is a view, in front elevation, of a meter installed in operative position in accordance with my invention, Fig. 2 is a view, in side elevation, partially in vertical section, of the assembly shown in Figure 1, Fig. 3 is a view, in rear elevation, of a meter embodied in my invention, Fig. 4 is a view, in front elevation, of an outlet box constituting a part of my invention, Fig. 5 is a view, in vertical section, taken on the line V—V of Fig. 4, Fig. 6 is a view, in front elevation, of a cover for the outlet box shown in Fig. 4, and Fig. 7 is a view in vertical section taken on the line VII—VII of Fig. 6, Fig. 8 is an enlarged view in horizontal section taken on the line VIII—VIII of Fig. 3, portions of the glass cover and meter base being broken away and the operating mechanism of the meter being omitted, illustrating the means for securing the meter cover to the base portion, Fig. 9 is a view, in isometric perspective of a short circuiting plug utilizable in conjunction with our invention, and Fig. 10 is a plan view of a sealing ring construction in accordance with our invention.

Referring to the drawings, and more particularly to Figs. 1 and 2, an electric meter assembled and mounted for operation in accordance with our invention, comprises a completely encased meter 1, having a base portion 2 suitably proportioned to be received into and engage the walls of a conduit outlet box 3. The outlet box is provided with a conduit extension 4, and is adapted to be connected to a conduit system, indicated generally as 5, by means of a nipple 6. It is to be understood, of course, that the conduit extension 4 may be associated with any of the knockout plugs in the side wall or back of the outlet box.

Referring more particularly to Fig. 2, the meter comprises an actuating mechanism of the integrating watt-meter type, and, since the particular construction of the meter mechanism is common and well known, a detailed description thereof is not deemed necessary.

The mechanism is clamped to the base portion 2 by means of bolts 7 extending through suitable aligned apertures in the base and in the laminated core structure 8.

The base portion, in the present embodiment, is of stamped sheet metal construction having a depressed central portion which serves the dual purpose of providing additional space to accommodate certain elements of the meter mechanism, and, as hereinafter described, reduces the hazard of unauthorized tampering with the meter mechanism. The base is further provided with an annular skirt or flange 9, preferably integral with the base and extending at right angles with respect to the plane thereof.

A plurality of contact pins 10 extend through, and are secured to, the base 2 and are suitably electrically insulated therefrom. The contact pins, preferably circular in lateral section, are provided with longitudinal slits to impart a certain amount of lateral resiliency thereto, and the free ends thereof are rounded for a purpose hereinafter disclosed.

The contact pins 10 extend substantially perpendicular to the plane of the base, and the inner ends thereof, which extend through the base and are suitably electrically insulated therefrom, are electrically connected to the operating windings of the meter mechanism.

A cover 11, substantially of cup-shape, is adapted to completely enclose the meter mechanism and has a peripheral flange formed thereon for facilitating the clamping thereof to the base portion 2. The cover may be of glass, as shown, or it may be of metal having a transparent portion adjacent to the register of the meter to permit the reading thereof without necessitating the removal of the cover. Further, if a glass cover is used, the inner surface thereof, except that portion adjacent to the registering dials, may be rendered translucent or coated with a paint or similar substance having an inconspicuous color.

A felt washer 12, or other suitable packing means, may be interposed between the cover and base portion adjacent to the peripheral edges thereof.

The cover 1 may be secured to the base portion 2 by any suitable means but we prefer, in the present embodiment, to employ a clamping ring 13 having a peripheral flange adapted to engage the peripheral flange on the cover and which is provided with sheet metal lugs 14 (shown more particularly in Fig. 8) secured thereto and adapted to project between the edge of the cover 1 and the edge of the base portion 2. Preferably two lugs are provided at diametrically opposed points on the clamping ring.

Additional sheet metal members or lugs 15 are secured to the base portion 2 and are adapted to cooperate with the lugs 14 to prevent relative axial movement between the cover 1 and the base 2.

In assembling the meter parts, the cover 1 is seated on the base portion in such a manner that the lugs 13 and 14 are not in engagement. Relative rotation of the cover and base results in the moving of the lugs 14 beneath the free ends of the lugs 15. A machine screw 16 may then be inserted in a suitably positioned screw-threaded aperture extending through the base portion and a cooperating aperture provided in one of the lugs 14 to prevent further rotative movement.

It has been found, in practice, that the joint between the glass cover and the ring 13 can be made sufficiently tight to prevent the passage of moisture therethrough. As a complete assurance, however, that the joint shall be weathertight, it may be desirable to coat the engaging surface of the cover and ring with a suitable cement or sealing compound.

With the structure thus far described, it is apparent that we have provided a completely encased unitary instrument structure whereby the use of, or necessity for, the usual flexible leads is avoided.

The mounting for the instrument, as previously stated, comprises an outlet box 3 rigidly secured to a conduit system 5. It is to be understood, of course, that although we have shown the box connected to a conduit system, obviously it may be mounted on a usual type of meter switchbox by means of a conduit connection.

The outlet box is similar to the usual boxes of this type and comprises a stamped sheet metal container substantially co-extensive in internal diameter with the external diameter of the skirt 9 on the base portion 2 of the meter. Openings 17 may be provided in the rear wall of the box to permit the same to be secured against a supporting structure, such as the wall of a building, but obviously any desired means for supporting the box may be employed.

A plurality of contact sockets 18 are loosely mounted in a block 19 of insulating material which is secured within the outlet box to the back wall thereof. The apertures through which the sockets extend are relatively large as compared to the external diameter of the sockets, so that a substantial lateral movement of the sockets in the apertures is permitted.

The leads 20 from the circuit to be metered are drawn through the conduit nipple 6 and the extension 4 secured to the outlet box, and are then suitably secured to the respective terminals 21 on the sockets 18. Sufficient space is provided between the insulating block 19 and the side wall of the outlet box to permit the leads 20 to be received therebetween. It has also been found desirable in practice to make the opening in the extension 4, and the opening in the box 3 and skirt 9 communicating therewith, substantially oval in horizontal section to facilitate the manipulation of the leads.

In practice, the outlet box is secured to the side wall of a building, or other suitable support, and the electrical connections between the leads 20, from the circuit to be metered, and the contact sockets 18 are effected. The electric meter 1 is then placed in position with the annular skirt 9 engaging the walls of the box. In the operation of inserting the meter into position, the contact pins 10 are moved into the corresponding sockets 18 and electrical connection to the windings of the meter is thereby effected in the single operation.

In the operation of inserting the meter into the outlet box, the rounded ends of the contact pins 10 first engage the edges of the respective sockets 18, and in the event the pins and sockets are not in exact alignment, further movement of the meter into the box causes movement of the sockets into correctly aligned positions. Because of the slitted construction of the contact pins, good electrical contact is afforded between the pins and the respective sockets. In order to increase the efficiency of this cooperation, the pins may each be provided with two longitudinal slits, disposed axially at right angles to each other to thereby increase the effective area of the pin in engagement with the surface of the socket wall.

If desired, cooperating pressed-in portions may be provided on the skirt 9 and side walls of the outlet box 3 to afford a means for guiding the meter into operative position. The pressed portions, however, do not extend the total width of the flange, or side wall, so that the weatherproof characteristics of the meter and box are not affected.

With the parts in operative position, as shown in Fig. 2, a grooved sealing ring 22 may be employed to engage the peripheral edges of the outlet box and the ring 12, and, when clamped in position, serves to maintain the meter in operative position in the outlet box and prevent the passage of rain or moisture into either the box or meter.

The sealing ring 22, as shown more clearly in Fig. 10, comprises two substantially semi-circular portions suitably hinged as at 23. The free end of one of the portions is provided with an apertured lug 24, and the free end of the other portion is provided with a hinged member 25 having an opening therein for the reception of the lug 24.

When the sealing ring is placed in position, the two semi-circular portions thereof are drawn tightly into engagement with the flanges of the clamping ring 13 and the peripheral flange on the outlet box. The hinged member 25 is then swung into position with the lug 24 projecting through the aperture formed therein. A flexible wire then may be threaded through the aperture in the lug and the ends of the wire may be embedded in a lead wafer 26 in accordance with the usual practice.

The meter, therefore, cannot be removed from the outlet box without breaking the wire or the wafer.

If desired, the cooperating peripheral edges of the clamping ring 13 and the box rim may be notched to accommodate the hinge pins of the portions 23 and 25 and such a construction insures the proper positioning of the sealing ring with respect to the meter and box rims.

In some instances it may be desirable, upon the removal of a meter, to cover the outlet box to prevent the entrance thereinto of dust and moisture. A cover 27 adapted to this purpose is shown in Figs. 6 and 7. The cover 27 is, in the present embodiment, of pressed sheet metal having a peripheral flange 28 of substantially the same external diameter as the flange or skirt 9 on the base portion of the meter. The flange 28 is adapted to fit within the outlet box, when the meter is removed, and the clamping ring 22 may then be placed in position in engagement with the flange on the peripheral edge of the outlet box and a bead 29 formed on the periphery or the cover. Access to the box is thereby prevented and the box is substantially weather-tight.

It is to be understood, of course, that the cover plate 27 may comprise no more than a disc of any suitable material having a diameter substantially equal to the outer diameter of the peripheral flange on the outlet box.

If it is desired not to interrupt the circuit to be metered while the meter is removed, contact pins 30, electrically connected by a conducting strip 31 and supported upon a base 32 of insulating material secured to the cover 27, may be employed. Coincident with the movement of the cover into operative position, the contact pins 30 are inserted into the sockets 18 in the outlet box. In the present embodiment, only two of the sockets 18 are electrically connected, but, obviously, the number and arrangement of the pins 30 is dependent upon the arrangement of the sockets 18 and the electrical connections thereof with the metered circuit.

A separate contact plug, such as plug 33 shown in Fig. 9, may be used to connect the appropriate leads from the metered circuit so that service is not interrupted when the meter is removed. The construction shown in Fig. 9, is substantially the same as that shown in Figs. 6 and 7 except that the plug is not secured to the cover plate.

Further, it is considered within the scope of the present invention to employ various forms of outlet boxes and various means for connecting the same to a conduit system depending upon the exigencies of a particular installation. It may be desirable, for example, to resort to a "through connection" whereby two conduit extensions, such as the extension 4, are provided and the conductors of the circuit to be metered are passed through the box. Also, in the case of a polyphase meter, a box of sufficient size and proportions will be required to receive the meter and the assembly may then be sealed weather-tight by means of a suitable sealing and clamping ring as previously described.

It will be obvious from the above description that we have provided a meter which may be mounted in an exposed position upon a dwelling or building. and which affords ready access thereto to facilitate the reading thereof, and, in the event that the meter is defective, it may be readily removed or replaced for testing purposes.

Further, if instead of replacing a defective meter it is desired merely to close the outlet box while the defective meter is being tested, we have provided a cover which maintains the outlet box weather-tight, and, at the same time, means are provided for electrically connecting certain of the circuit terminals so that the customer's power supply is not interrupted.

It will be noted, further, that, with the construction described, unauthorized tampering with the meter with a view toward altering the operation of the meter mechanism or the short circuiting of certain of the connections whereby the operation characteristics of the meter are altered, is minimized.

For example, if an attempt is made to insert wires or instruments under the sealing ring, such as the ring 22, either to interrupt the moving parts of the meter or to short circuit certain of the operating windings thereof, access cannot be had to the meter operating mechanism, because of the clamping ring 13 and because of the annular flange or skirt 9 formed integral with the meter base.

Further, if an attempt is made to drill small holes through the side wall of the meter base to permit the insertion therethrough of means for short circuiting certain of the operating windings, the drill bit will finally engage the sloping surface of the pressed portion of the meter base and will result either in breaking the drill bit, or, at least, in preventing further drilling.

The fact is recognized, of course, that if a theft of the meter is contemplated, or if it is determined to steal current from the line before it goes through the meter, the conduit connections 5 and 6 may be disrupted or the meter glass 11 may be broken. Such occasions rarely arise, however, and with the construction described, the possibility of unauthorized tampering with the meter, which cannot be readily detected, is reduced to a minimum.

Although we have shown and described an embodiment of our invention comprising a watthour meter and a mounting therefor, it is clearly within the scope of our invention to mount other types of electrical instruments in the manner shown and described. Any type of electrical instrument may be provided with contact pins, and a base suitably proportioned to cooperate with an outlet box, such as the box 3. Further, while the present embodiment is particularly adaptable for outdoor use, quite obviously the construction disclosed may be used in any place or position where a quickly-detachable mounting is desired.

In addition, although we have shown contact pins and sockets for establishing the desired electrical connections, quite obviously other means such as resilient contact fingers, brushes, switch blades, and the like may be employed.

Various modifications may be made in our invention without departing from the spirit and scope thereof, and we desire, therefore, that only such limitations shall be placed thereon as are set forth in the appended claims and disclosed by the prior art.

We claim as our invention:

1. A detachable out-door meter comprising a completely encased meter mechanism having electrical contacts mounted thereupon, a conduit outlet box adapted to engage said meter in supporting relation having a plurality of contacts disposed therein and arranged to engage said first-mentioned contacts when said meter is in operative position, and means for clamping said meter to said box in weather-tight relation.

2. An electrical instrument including a base, a support therefor proportioned to receive a portion of said base, means for clamping said base to said support in separable weather-tight relation, and a plurality of cooperating contact members disposed on said base and said support.

3. A detachable out-door electric meter comprising a completely encased meter structure having electrical contact members projecting from the casing thereof, a conduit outlet box having contacts therein disposed to cooperate with said first-named contacts, and means cooperating with said meter casing and outlet box for separably supporting said meter in operative position in said box and for preventing the entrance of moisture thereinto.

4. The combination with an electric meter comprising a completely encased meter mechanism having electrical contacts projecting from a wall of the casing thereof, of a conduit outlet box having contact members secured therein and electrically connected to a circuit to be metered, cooperating means on said meter casing and said outlet box whereby a portion of said meter may be inserted into said box and said contacts simultaneously engaged in operative relation, and means for clamping said meter to said box in weather-tight relation.

5. The combination with an encased electric meter having contacts projecting from the casing thereof, of a conduit outlet box, means for removably securing said meter to said box, and constituting a weather-tight joint therebetween, and means operative upon the movement of said meter into said box for electrically connecting said contacts to a circuit to be metered.

6. An electrical instrument comprising a base adapted to support an operating mechanism and a cover for said mechanism, a terminal box, means upon said base for engaging said box, means for securing said cover to said base, means engaging said securing means for securing said instrument to said box, and a plurality of cooperating contact members on said terminal box and said instrument base.

7. An electrical instrument comprising a base adapted to support an operating mechanism, a cover for said mechanism, an outlet box, means upon said base for engaging said box, means for securing said cover to said base, means cooperating with said securing means for clamping said instrument to said box and for providing a weather-tight joint therebetween, and a plurality of cooperating contact members on said outlet box and said instrument base.

8. An electrical instrument and mounting means therefor comprising an outlet box, means on said instrument for operatively engaging said box, means for clamping said instrument to said box in operative weather-tight relation, and means comprising a plurality of cooperating contact members for electrically connecting said instrument and said outlet box when in operative position.

9. An electrical instrument including a base, a support therefor comprising a terminal box substantially coextensive in lateral dimensions with said base, and means for clamping said base to said box, said base embodying means comprising a shield having a surface sloping relative to a wall of said box for deflecting an object passed thru said wall.

10. In an electrical instrument having contact members secured thereto, a support for engaging said instrument and enclosing said contact members, and means for clamping said instrument to said support comprising a pair of hinged members proportioned to engage the adjacent peripheral edges of said instrument and box in weather-tight relation, and means for securing said hinged members in operative position.

11. The combination with a terminal box, of a correspondingly proportioned electric meter movable into and from said box, the meter and box having terminals in relative positions to contact and complete a circuit when the meter is in the box, and means comprising a weather-tight joint for sealing the meter in position in the casing.

12. In an electric meter and mounting therefor comprising an encased meter element, an outlet box proportioned to receive said meter in supporting relation, cooperating electrical contacts carried by said meter and box for completing a circuit to said meter, and means for clamping said meter to said box constituting a weather-tight joint therebetween.

13. A detachable meter device comprising a completely encased meter mechanism including electrical contacts mounted thereupon, a conduit outlet box adapted to receive a portion of said meter in supporting relation having a plurality of contacts disposed therein and arranged to engage said first-mentioned contacts when said meter is in operative position, and means for clamping said meter to said box and sealing the meter and box against the admission of foreign matter therebetween.

In testimony whereof, we have hereunto subscribed our names this 6th day of September, 1928.

WALTER G. MYLIUS.
BERT G. LA BAR.